United States Patent
Iyer et al.

(10) Patent No.: US 11,190,395 B2
(45) Date of Patent: Nov. 30, 2021

(54) ALERTING SERVICE PROVIDER OF FAILED NETWORK CONNECTIVITY BY IOT-ENABLED MODEM

(71) Applicant: International Business Machines Corporation, Armonk, NY (US)

(72) Inventors: Chitra A Iyer, Karnataka (IN); Jeffrey I S Dare, Karnataka (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 87 days.

(21) Appl. No.: 16/058,980

(22) Filed: Aug. 8, 2018

(65) Prior Publication Data
US 2020/0052956 A1 Feb. 13, 2020

(51) Int. Cl.
*H04L 12/24* (2006.01)
*H04L 12/26* (2006.01)
*H04L 12/707* (2013.01)
*H04L 12/703* (2013.01)

(52) U.S. Cl.
CPC ........ *H04L 41/0686* (2013.01); *H04L 43/065* (2013.01); *H04L 43/0811* (2013.01); *H04L 45/22* (2013.01); *H04L 45/28* (2013.01)

(58) Field of Classification Search
CPC ..... H04L 12/56; H04L 29/08; H04L 41/0686; H04L 43/065; H04L 43/0811; H04L 45/22; H04L 45/28; H04W 76/028; G06F 11/00
See application file for complete search history.

(56) References Cited

U.S. PATENT DOCUMENTS

| | | | | |
|---|---|---|---|---|
| 9,525,607 | B2* | 12/2016 | Poe | H04L 43/0811 |
| 2007/0121640 | A1* | 5/2007 | Wang | H04M 11/062 370/395.1 |
| 2009/0013210 | A1* | 1/2009 | McIntosh | H04L 41/0672 714/4.1 |
| 2009/0274052 | A1* | 11/2009 | Howarter | H04L 41/507 370/242 |
| 2012/0044804 | A1* | 2/2012 | Rahman | H04L 45/28 370/225 |
| 2016/0094388 | A1* | 3/2016 | Britt, Jr. | H04L 67/141 370/254 |

(Continued)

OTHER PUBLICATIONS

RF Monolithics, Inc; RFM Announces New Peel and Stick Wireless Sensor Networking Platform Products, Sensors Expo & Conference 2011; Jun. 7, 2011.

(Continued)

*Primary Examiner* — Joseph L Greene
(74) *Attorney, Agent, or Firm* — Garg Law Firm, PLLC; Rakesh Garg; Michael O'Keefe

(57) ABSTRACT

Alerting a service provider of failed network connectivity includes determining, by a modem device, a loss of connectivity of the modem device with a network. The modem device sends a first notification of the loss of connectivity to a service provider using a first communication. A second notification of a type of the loss of connectivity and a resolution time for the loss of connectivity is received using a second communication. The second communication includes an out-of-band communication. The second communication is sent by the service provider and received by a first device associated with a user.

18 Claims, 5 Drawing Sheets

(56) References Cited

U.S. PATENT DOCUMENTS

| | | |
|---|---|---|
| 2016/0360430 A1 | 12/2016 | Stevens et al. |
| 2017/0118091 A1 | 4/2017 | Townend et al. |
| 2018/0098233 A1* | 4/2018 | Talari .................... G06N 20/00 |
| 2019/0007847 A1* | 1/2019 | Abramovitz .......... H04L 41/069 |

OTHER PUBLICATIONS

A.B.M. (Fonzie) van der Mierden; Designing Viable Networked Business Models for the Internet of Things, Eindhoven University of Technology; 2015.

* cited by examiner

ALERTING SERVICE PROVIDER OF FAILED NETWORK CONNECTIVITY BY IOT-ENABLED MODEM

TECHNICAL FIELD

The present invention relates generally to a method, system, and computer program product for alerting a service provider of failed network connectivity. More particularly, the present invention relates to a method, system, and computer program product for alerting a service provider of failed network connectivity by an IoT-enabled modem.

BACKGROUND

A modem is a network device that enables client devices to communicate with an external network. Examples of modems include, but are not limited to, cable modems, asymmetric digital subscriber line (ADSL) modems, and mobile broadband modems. The Internet of Things (IoT) is a network of interconnected computing devices such as smart devices and sensors that are capable of collecting data and/or sharing data with one another via internet connectivity. An IoT-enabled modem is often enabled to allow a client device to communicate with an external network using both a broadband network, such as a cable modem network or telephone network, and a wireless service provider network such as a Long-Term Evolution (LTE) network.

SUMMARY

The illustrative embodiments provide a method, system, and computer program product. An embodiment of a method of alerting a service provider of failed network connectivity includes determining, by a modem device, a loss of connectivity of the modem device with a network. The embodiment further includes sending, by the modem device, a first notification of the loss of connectivity to a service provider using a first communication. The embodiment further includes receiving a second notification of a type of the loss of connectivity and a resolution time for the loss of connectivity using a second communication. In the embodiment, the second communication includes an out-of-band communication, and the second communication is sent by the service provider and received by a first device associated with a user.

In another embodiment, the type of the loss of connectivity includes at least one of a loss of connectivity of the modem device with the service provider or a loss of connectivity of the modem device with the internet.

In another embodiment, the first communication is a direct communication between the modem device and the service provider. In the embodiment, the first communication is responsive to a loss of connectivity of the modem device with the internet.

In another embodiment, the first communication is an out-of-band communication. In the embodiment the out-of-band communication is responsive to a loss of connectivity of the modem device with the service provider.

In another embodiment, the out-of-band communication includes at least one of an electronic mail message or a short message service (SMS).

In another embodiment, the sending of the first notification of the loss of connectivity to the service provider further includes sending, by the modem device, the first notification to the first device. The embodiment further includes sending, by the first device, the first notification to the service provider using the first communication.

In another embodiment, the first notification is sent to the first device using a wireless communication protocol. In another embodiment, the first device is a mobile device. In another embodiment, the first notification is sent using a wireless service provider.

In another embodiment, the resolution time is an approximate resolution time. In another embodiment, the second out-of-band communication includes at least one of an electronic mail message or a short message service (SMS).

In another embodiment, the service provider is configured to receive the first indication, determine the type of the loss of connectivity, determine the resolution time for the loss of connectivity, and send the second notification to the first device using the second communication.

In another embodiment, the service provider is configured to determine that a number of indications of a loss of connectivity received within a predetermined time period from one or more modems located within an area has exceeded a threshold value, and send an alert to a system associated with the service provider indicating that the threshold value has been exceeded.

In another embodiment, the service provider is configured to send a status update indicative of the loss of connectivity to a system associated with a front office of the service provider.

In an embodiment, the service provider is an internet service provider (ISP).

An embodiment of a method for notifying of failed network connectivity of a modem device includes receiving a first notification indicative of a loss of connectivity of a modem device with a network, determining a type of the loss of connectivity, determining a resolution time for the loss of connectivity, and sending a second notification including the type of the loss of connectivity and the resolution time for the loss of connectivity using an out-of-band communication.

In another embodiment, the second notification is sent by a service provider and received by a first device associated with a user.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
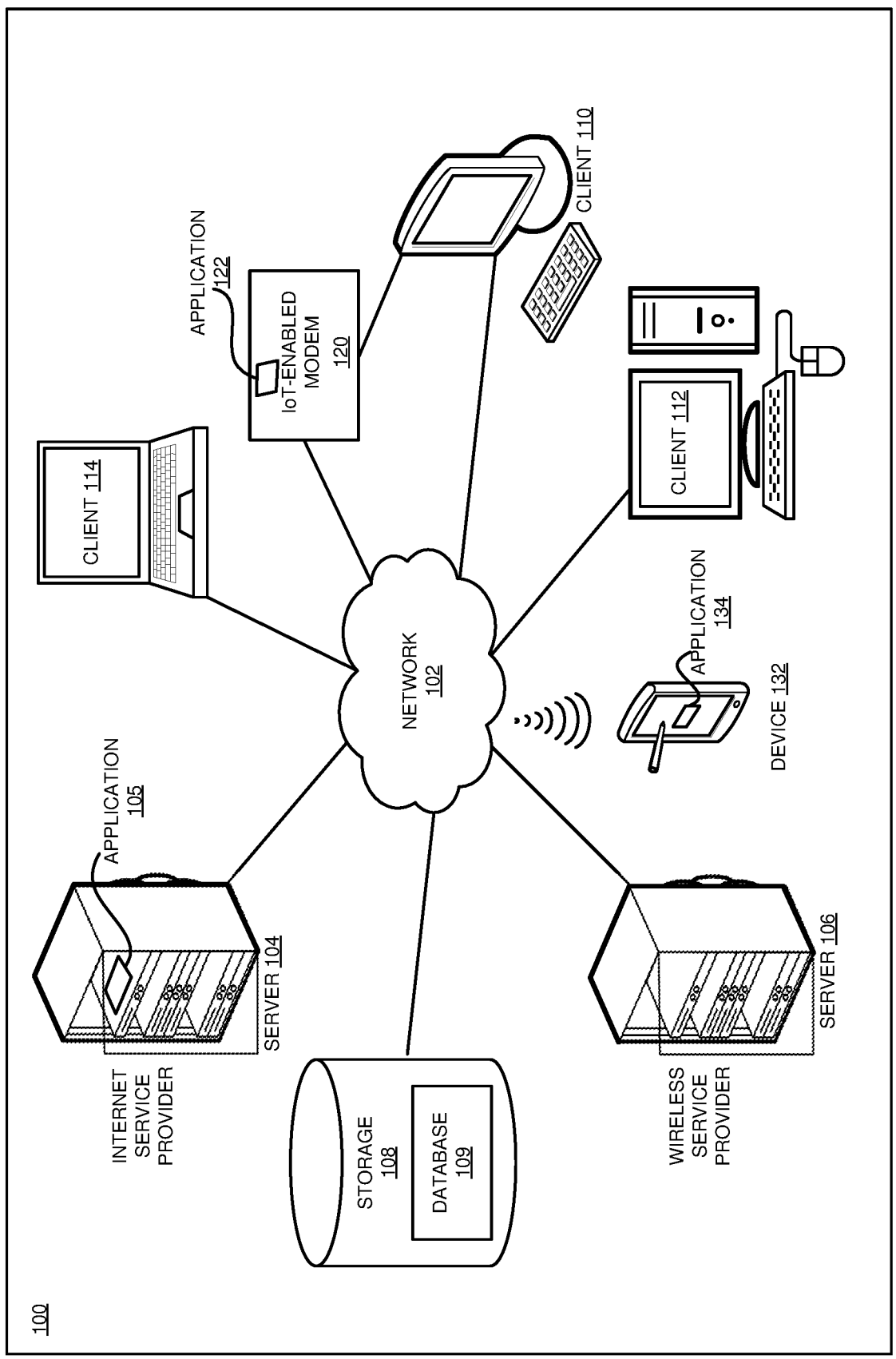
FIG. 1 depicts a block diagram of a network of data processing systems in which illustrative embodiments may be implemented.

One or more embodiments are directed to alerting a service provider of failed network connectivity by an IoT-enabled modem. Broadband modems, such as cable modems and ADSL modems, are found in many homes and businesses, and are used for a variety of purposes in which continuous internet connectivity and/or high bandwidth is desired. Customers who require continuous internet connectivity and high bandwidth are often willing to pay well for quality services. Intermittent loss of internet connectivity becomes a pain point to the customer and quicker resolution of the underlying issue becomes the responsibility of the Internet Service Provider (ISP). If the ISP fails at resolving loss of internet connectivity in a timely fashion, the customer may switch to another ISP.

The illustrative embodiments used to describe the invention generally address and solve the above-described problems and other problems related to alerting a service provider of failed network connectivity. One or more embodiments, allowed for a modem that is enabled with Internet of Things capability to communicate loss of internet connectivity to the ISP, allowing the ISP to respond to the loss of connectivity immediately and resolve the underlying issue thereby providing quicker resolution to the customer and improving the ISP's credibility. An increase in trust of the ISP by the customers may thereby lead to an increase in the number of customers.

One or more embodiments are directed to a system, method, and apparatus an IoT-enabled modem device configured to notify an Internet Service Provider (ISP) of loss of internet connectivity with the IoT-enabled modem device via an out-of-band notification such as an electronic mail (email) or short message service (SMS) message sent via a cellular communication path provided by a wireless service provider. In one or more embodiments, the IoT-enabled modem device is configured to communicate whether the connectivity issue is with loss of modem connectivity with the ISP or whether the connectivity issue is due to a loss of internet connection.

In one or more embodiments, upon receipt of the notification, the ISP determines the identity of the customer affected by the connectivity failure and determines an approximate resolution time to correct the connectivity failure. In one or more embodiments, the ISP informs the customer on the loss of internet connectivity, a reason for the loss and the approximate resolution time of the connectivity failure and starts working immediately on a resolution of the connectivity issue.

In one or more embodiments, the ISP may receive loss of connectivity notifications from a number of modems within a particular service area within a predetermined time period, and determine that an entire area has been affected by loss of connectivity. In an embodiment, the ISP then communicates the loss of connectivity and the approximate resolution time to all customers residing in that area through the customer's preferred means of communication and works on resolving the issue.

One or more embodiments provide for an advantage of a quicker resolution to Internet connectivity issues for the customer, resulting in higher productivity to the customer. One or more embodiments provide for another advantage of relieving the customer of a need to inform the ISP of loss of connectivity through a telephone call and spend time in registering a complaint. One or more embodiments provide for another advantage of reducing the number of staff at call centers of the ISP needed to register outage complaints due to a reduction in telephone calls.

In an embodiment, details of each IoT-enabled modem within a network including a location at which each IoT-enabled modem is present are registered with an ISP system. In the embodiment, when the IoT-enabled modem detects a loss of connectivity with the internet, the IoT-enabled modem directly communicates the loss of internet connectivity to the ISP. When the IoT-enabled modem detects loss of connectivity between the ISP and the IoT-enabled modem (e.g., a loss of an ADSL signal), the IoT-enabled modem communicates a notification of the details of the loss of connectivity to the ISP system using an out-of-band communication. In a particular embodiment, the out-of-band communication includes an email and/or an SMS message delivered by a wireless service provider. In other embodiments, the IoT-enabled modem is configured to communicate the loss of connectivity to the ISP system directly when a connection between the IoT-enabled modem and the ISP system is present and an internet connection is not available.

In the embodiment, the ISP system determines a corrective action to address the loss of connectivity and an approximate resolution time and communicates the loss of internet connectivity along with the approximate resolution time to the consumer through the out-of-band communication such as an email and/or SMS message. In an embodiment, the ISP also updates the system used by a front office with the details so that a customer care representatives can handle queries from customers accordingly.

In one or more embodiments, the ISP system determines a major disruption in connectivity in an area based on a high volume of internet connectivity related error messages being received from one or more modems in an area within a predetermined time period. In one or more embodiment, when such a disruption is noticed, the ISP system sends a communication to all customers in that area on the connectivity interruption and the approximate resolution time through out-of-band communication such as email or SMS. In an embodiment, the ISP system also updates connectivity interruption details at a system used by the front office so that customer care representatives can provide appropriate details to customer queries.

In an embodiment, the ISP system determines that issues related to a damaged or used modem exist based upon receiving connectivity loss notifications from the particular modem by performing an analysis on the data store. In an embodiment, the ISP system sends proactive alerts to a user/consumer associated with the modem if the ISP system determines that the modem is damaged or has been used beyond a recommended period of time.

An embodiment can be implemented as a software application. The application implementing an embodiment can be configured as a modification of an existing modem and/or service provider system, as a separate application that operates in conjunction with an existing modem and/or service provider system, a standalone application, or some combination thereof.

The illustrative embodiments are described with respect to certain types of connectivity loss alert generation procedures and algorithms, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
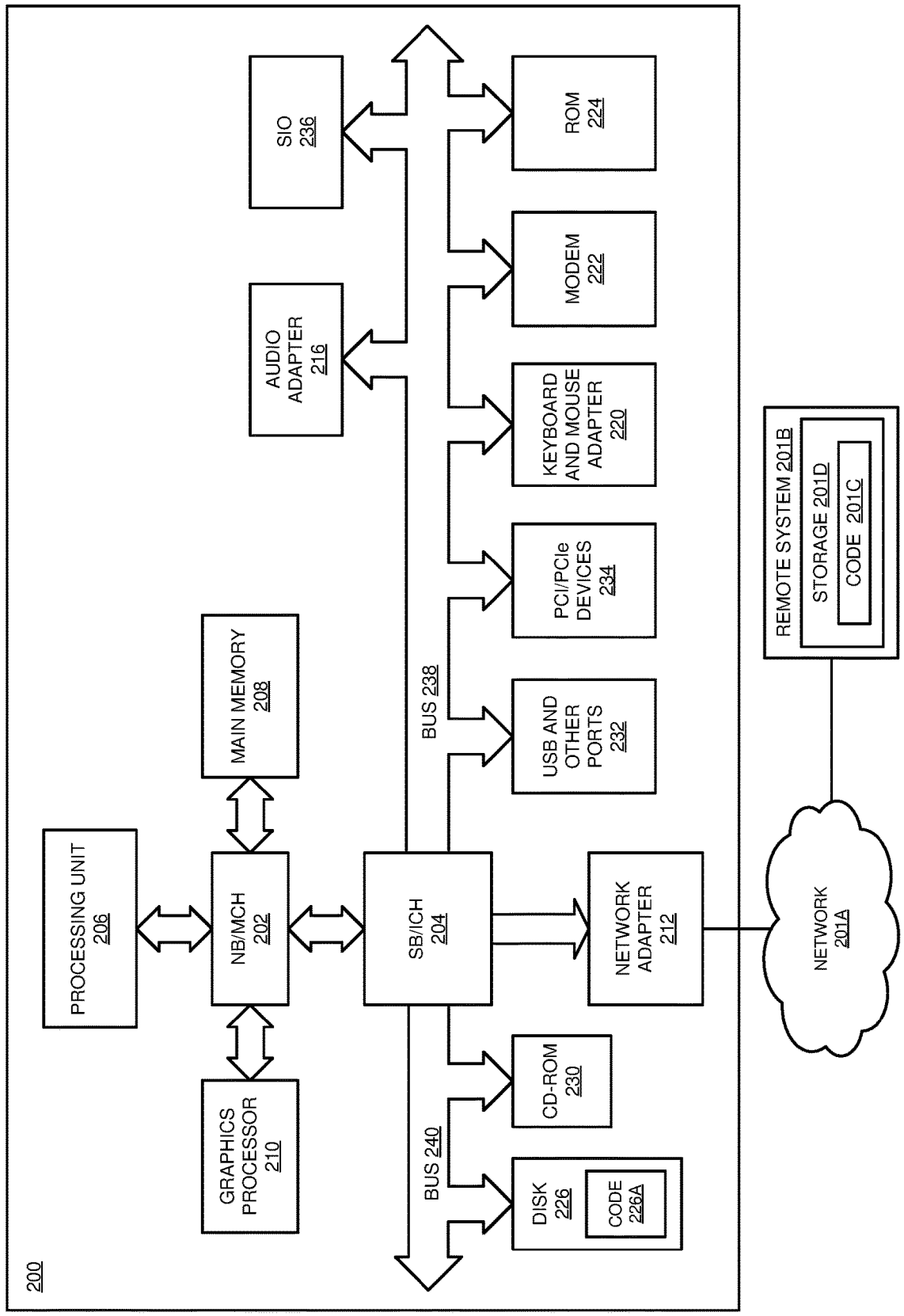
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. ISP server 104 and wireless service provider server 106 couple to network 102 along with storage unit 108. Software applications may execute on any computer in data processing environment 100. Clients 110, 112, and 114 are also coupled to network 102. In the embodiment, client 110 is coupled to network 102 by an IoT-enabled modem 120. A data processing system, such as server 104 or 106, or client 110, 112, or 114 may contain data and may have software applications or software tools executing thereon.

IoT-enabled modem 120 is an example of an IoT-modem device described herein. For example, IoT-enabled modem 120 can take the form of a cable modem, an ADSL modem, or a mobile broadband modem. IoT-enabled modem 120 includes an application 122 configured to perform one or more functions of IoT-enabled modem 120 related to detecting a loss of connectivity with an ISP and sending a notification indicative of the loss of connectivity as described herein.

Device 132 is an example of a device described herein. For example, device 132 can take the form of a smartphone, a tablet computer, a laptop computer, a mobile device, client 110 in a stationary or a portable form, a wearable computing device, or any other suitable device. Device 132 includes an application 134 configured to receive the notification indicative of the loss of connectivity from IoT-enabled modem 120 and send the notification to ISP server 104 as described herein. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

ISP server 104 includes an application 105. Application 105 implements an embodiment of an ISP system described herein. In an embodiment, application 105 is configured to perform one or more of the receiving of notifications indicative of loss of connectivity by IoT-enabled modem 120, determining the identity of a customer affected by the connectivity failure, determining an approximate resolution time to correct the connectivity failure, and informing the customer of the details and the approximate resolution time of the connectivity failure as described herein. Database(s) 109, such as a modem registration and customer profile database may be stored in storage 108 as shown or supplied by another source (not shown).

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
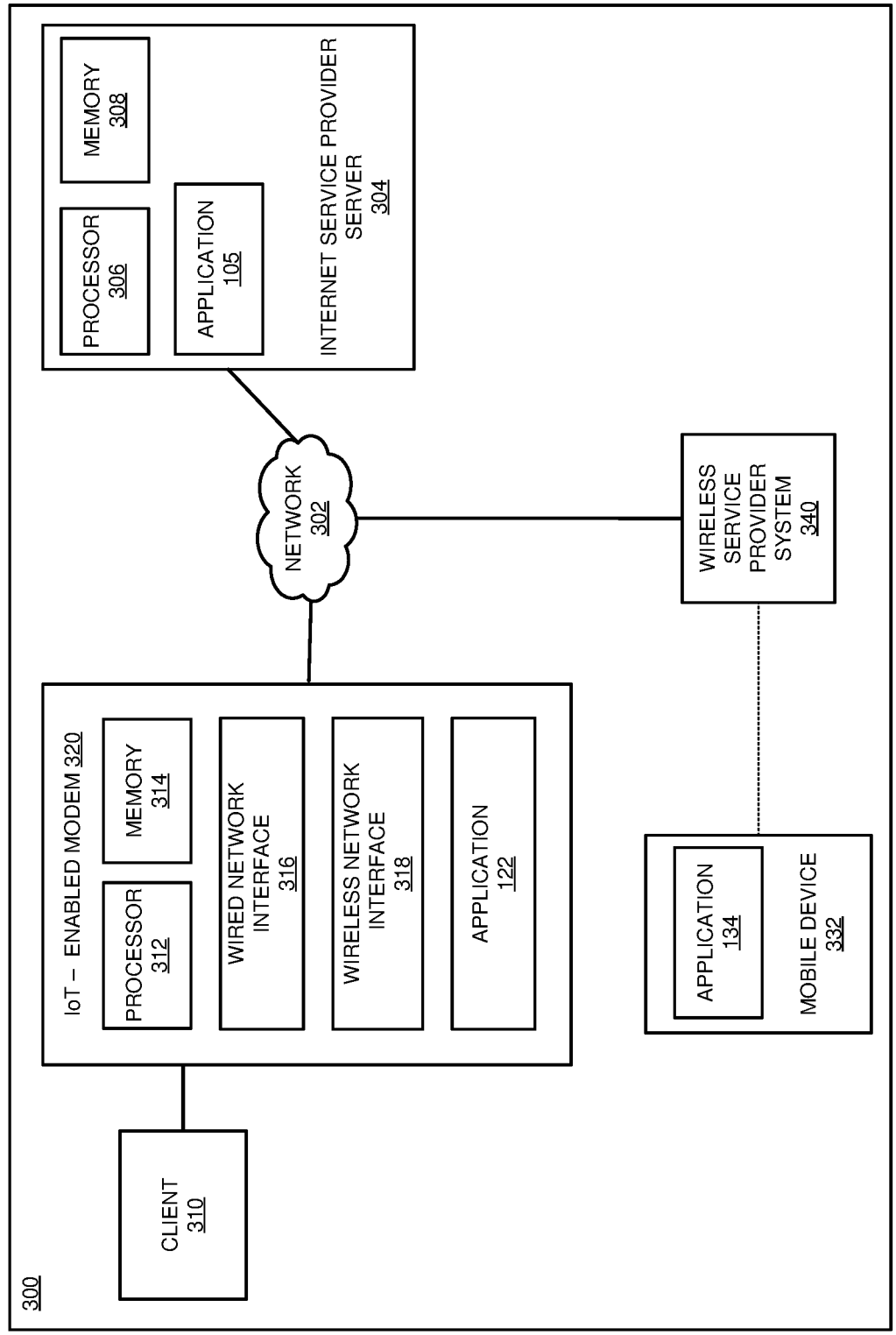
FIG. 3 depicts a block diagram of an example configuration for alerting a service provider of failed network connectivity by an IoT-enabled modem in accordance with an illustrative embodiment.

With reference to FIG. 3, this figure depicts a block diagram of an example configuration for alerting a service provider of failed network connectivity by an IoT-enabled modem in accordance with an illustrative embodiment. The example embodiment includes a client device 310, an IoT-enabled modem 320, an ISP server 304, a mobile device 332, and a wireless service provider system 340. Client device 310 is in communication with IoT-enabled modem 320, and mobile device 332 is in communication with wireless service provider system 340. Each of IoT-enabled modem 320, ISP server 304, and wireless service provider system 340 are in communication with network 302. In a particular embodiment, client device 310, IoT-enabled modem 320, and mobile device 332 are located at a customer premise location.

ISP server 304 is an example of ISP server 104 of FIG. 1 and includes a processor 306, a memory 308, and application 105. Processor 306 is configured to retrieve instructions from memory 308 and execute the instructions provided by application 105 to perform various operations of ISP server 304 as described herein. Client device 310 is an example of client 110 of FIG. 1. IoT-enabled modem 320 is an example of IoT-enabled modem 120 of FIG. 1 and includes a processor 312, a memory 314, a wired network interface 316, a wireless network interface 318, and application 122. Processor 312 is configured to retrieve instructions from memory 314 and execute the instructions provided by application 122 to perform various operations of IoT-enabled modem 320 as described herein. In one or more embodiments, wired network interface is configured to enable wired communication with one or more of client device 310 and ISP server 304. Wireless network interface 318 is configured to provide wireless communication with mobile device 332.

Mobile device 332 is an example of device 132 of FIG. 1 and includes application 134. Mobile device 332 is configured to receive notifications indicative of loss of connectivity from IoT-enabled modem 320 and send the notifications to ISP server 304 via wireless provider system 340 using an out-of-band communication such as an email or SMS message.

In an embodiment, IoT-enabled modem 320 registers a location at which IoT-enabled modem 320 is present and/or a user (e.g., a customer) associated with IoT-enabled modem 320 with ISP server 304. In the embodiment, IoT-enabled modem 320 is configured to provide connectivity of client device 310 with ISP server 304, and ISP server 304 is configured to provide Internet connectivity to client device 310 via IoT-enabled modem 320. In the embodiment, IoT-enabled modem 320 detects a loss of connectivity with the internet or loss of connectivity between ISP server 304 and IoT-enabled modem 320.

In the embodiment, IoT-enabled modem 320 sends a notification of the details of the loss of connectivity to mobile device 332, and mobile device 332 sends the notification to ISP server 304 using an out-of-band communication. In a particular embodiment, IoT-enabled modem 320 sends the notification to mobile device 332 using a wireless communication protocol such as a Bluetooth™ protocol. In a particular embodiment, the out-of-band communication includes an email and/or an SMS message delivered by wireless service provider 340 to ISP server 304. In other particular embodiments, such as availability of ISP connectivity and absence of internet connectivity, IoT-enabled modem 320 sends the notification of the details of the loss of connectivity to ISP server 304 without using mobile device 332.

In the embodiment, ISP server 304 determines a corrective action to address the loss of connectivity and begins work on resolving the connectivity issue with IoT-enabled modem 320. In the embodiment, ISP server 304 determines an approximate resolution time for resolving the loss of connectivity of IoT-enabled modem 320, obtains user information (e.g., customer details) associated with IoT-enabled modem 320, and communicates an alert including the reason for and/or type of the loss of connectivity along with the approximate resolution time to the user through out-of-band communication such as an email and/or SMS message. In a particular embodiment, ISP server 304 sends the alert to mobile device 332.

Figure 4:
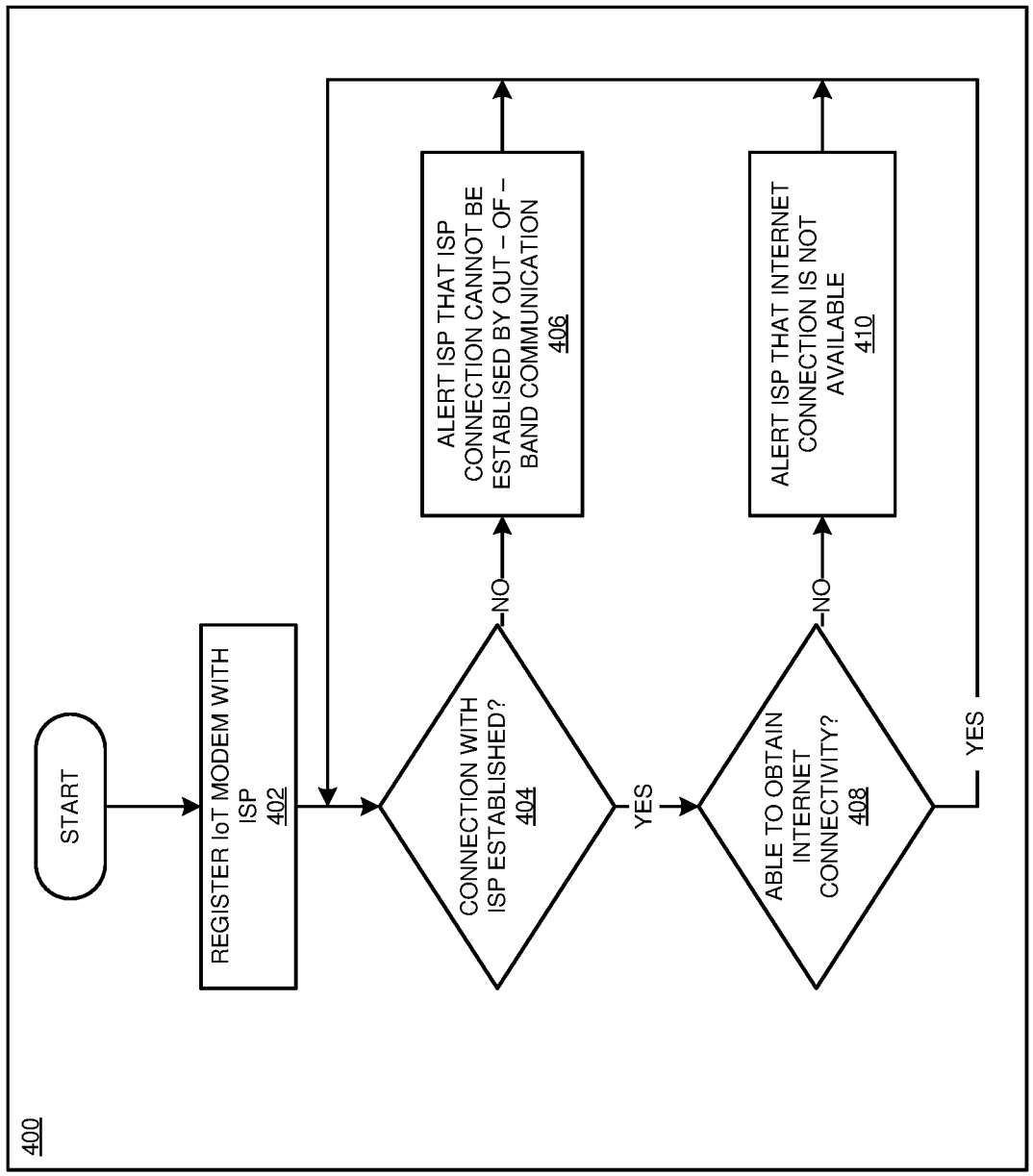
FIG. 4 depicts a flowchart of an example process for alerting a service provider of failed network connectivity by an IoT-enabled modem in accordance with an illustrative embodiment.

With reference to FIG. 4, this figure depicts a flowchart of an example process 400 for alerting a service provider of failed network connectivity by an IoT-enabled modem in accordance with an illustrative embodiment. In an embodiment, the operations of process 400 are performed by IoT-enabled modem 320. In block 402, IoT-enabled modem 320 registers with ISP server 304. In a particular embodiment, IoT-enabled modem 320 registers a location at which IoT-enabled modem 320 is present and/or a user (e.g., a customer) associated with IoT-enabled modem 320 with ISP server 304. In the embodiment, IoT-enabled modem 320 is configured to provide connectivity of client device 310 with ISP server 304, and ISP server 304 is configured to provide internet connectivity to client device 310 via IoT-enabled modem 320. In block 404, IoT-enabled modem 320 determines whether IoT-enabled modem 320 has a connection established with ISP server 304. If IoT-enabled modem 320 determines that a connection is not established with ISP server 304, IoT-enabled modem 320 determines that a loss of connectivity between IoT-enabled modem 320 and ISP server 304 has occurred and process 400 continues to block 406. In block 406, IoT-enabled modem 320 sends an alert to ISP server 304 by an out-of-band communication indicating that the connection between IoT-enabled modem 320 and ISP server 304 cannot be established and, waits for a period of time, for example, 30 minutes after sending the communication, and then process 400 returns to block 404. The period of wait can be configured by the ISP and the modem provider.

If IoT-enabled modem 320 determines that a connection is established with ISP server 304, process 400 continues to block 408. In block 408, IoT-enabled modem 320 determines whether IoT-enabled modem 320 is able to obtain internet connectivity. If IoT-enabled modem 320 determines that IoT-enabled modem 320 is not able to obtain internet connectivity, IoT-enabled modem 320 determines that a loss of internet connectivity for IoT-enabled modem 320 has occurred and process 400 continues to block 410. In block 410, IoT-enabled modem 320 sends an alert to ISP server 304 by an out-of-band communication indicating that the internet connection is not available for IoT-enabled modem 320, waits for a first predetermined period of time, for example, thirty (30) minutes after sending the communication, and then process 400 returns to block 404. In an embodiment, IoT-enabled modem 320 sends the alert to ISP server 304 directly when a direct connection between IoT-enabled modem 320 and ISP server 304 is available but the connection not the internet is not available. If IoT-enabled modem 320 determines that internet connectivity is obtained for IoT-enabled modem 320, IoT-enabled modem 320 waits for a second predetermined period of time, for example two (2) minutes, and process 400 returns to block 404. In particular embodiments, the duration of wait of the first predetermined time period and the second predetermined time period can be configured by the ISP and/or modem provider.

In a particular embodiment, IoT-enabled modem 320 sends the notification of the details of the loss of connectivity to mobile device 332, and mobile device 332 sends the notification to ISP server 304 using an out-of-band communication. In a particular embodiment, IoT-enabled modem 320 sends the notification to mobile device 332 using a wireless communication signals such as a Bluetooth signal. In another embodiment, IoT-enabled modem 320 sends the notification of the details of the loss of connectivity to ISP server 304 without requiring the use of mobile device 332. In a particular embodiment, the out-of-band communication includes an email and/or an SMS message.

Figure 5:
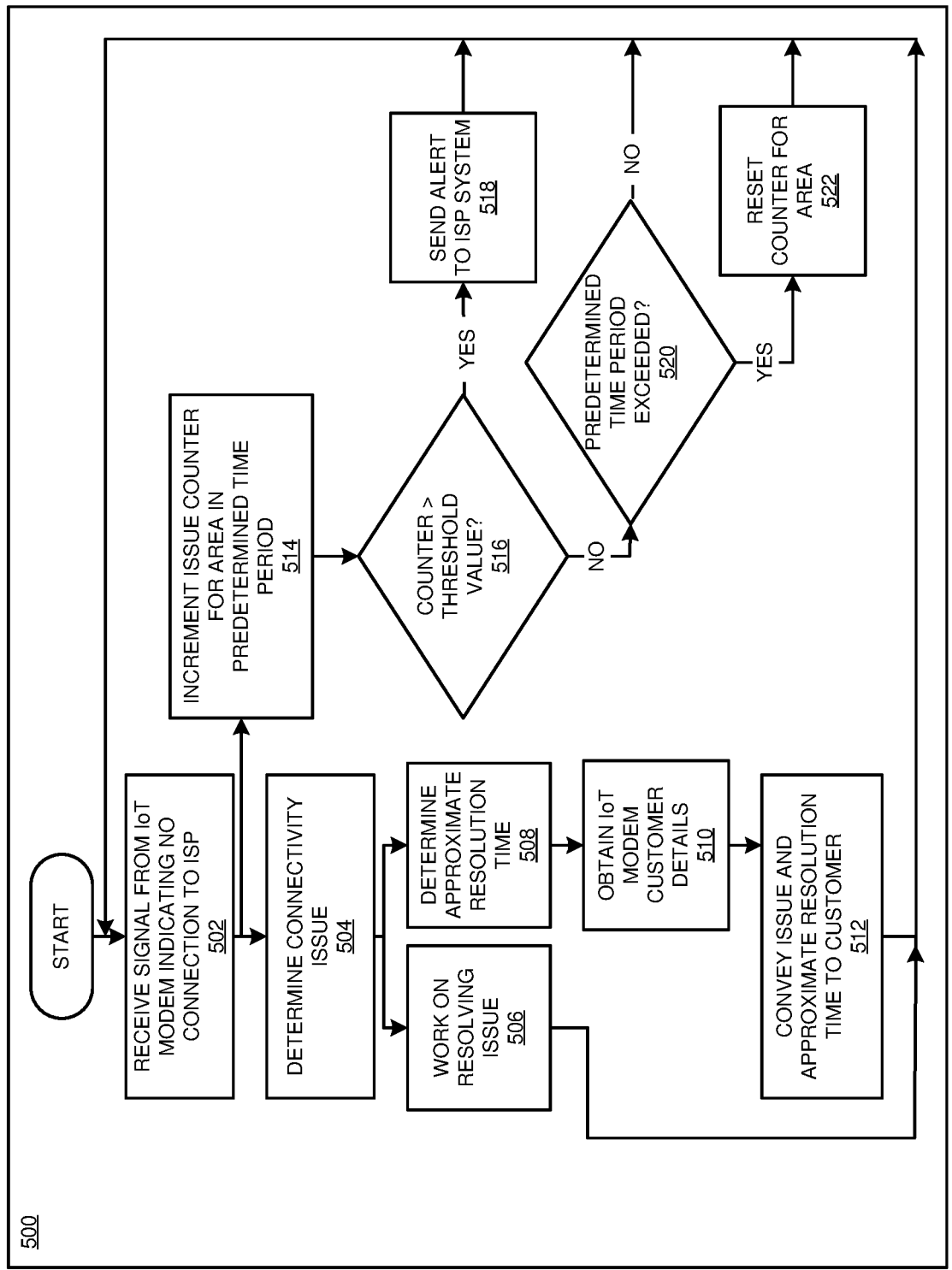
FIG. 5 depicts a flowchart of an example process in which a service provider processes a signal indicating failure of connectivity from an IoT-enabled modem in accordance with an illustrative embodiment.

With reference to FIG. 5, this figure depicts a flowchart of an example process 500 in which a service provider processes a signal indicating failure of connectivity from an IoT-enabled modem in accordance with an illustrative embodiment. In the embodiment, a service provider alerts failed network connectivity to customer(s) who do not have internet connectivity. In an embodiment, the operations of process 500 are performed by ISP server 304.

In block 502, ISP server 304 receives a notification or other signal from IoT-enabled modem 320 by an out-of-band communication indicating a loss of connectivity for IoT-enabled modem 320. In a particular embodiment, the out-of-band communication includes one or more of an email or SMS message. In a particular embodiment, the loss of connectivity includes one or more of a loss of connectivity of IoT-enabled modem 320 with the internet or loss of connectivity between IoT-enabled modem 320 and ISP server 304. In block 504, ISP server 304 determines the connectivity issue associated with IoT-enabled modem 320 indicated by the notification.

In block 506, in a first thread, ISP server 304 determines a corrective action to address the loss of connectivity and begins work on resolving the connectivity issue with IoT-enabled modem 320. In block 508, in a second thread, ISP server 304 determines an approximate resolution time for resolving the loss of connectivity of IoT-enabled modem 320. In block 510, ISP server 304 obtains user information (e.g., customer details) associated with IoT-enabled modem 320 from a data store such as database 109.

In block 512, ISP server 304 conveys an indication including the reason for the loss of connectivity and the approximate resolution time to the user (e.g. customer) through an out-of-band communication. In a particular embodiment, ISP server 304 sends an indication to the user using an email and/or SMS message. In one or more embodiment, ISP server 304 also updates a system that is used by front office representatives with the appropriate details, so that customer communications through other means such as phone calls can be handled.

In block 514, in a third thread after block 502, ISP server 304 increments an issue counter indicating a number of connectivity issues received for an area associated with the location of IoT-enabled modem 320 from IoT-enabled modem 320 and/or other modems within the area within a predetermined time period. In block 516, ISP server 304 determines whether the issue counter has exceeded a threshold value. If ISP server 304 determines that the issue counter has exceeded the threshold value, in block 518 ISP server 304 sends and alert to an ISP system associated with ISP server 304 indicating that the issue threshold for the area has been exceeded and process 500 returns to 502. In one or more embodiments, the ISP system proactively informs all of the customers in the area through SMS/email of the connectivity failure and the expected resolution time. In one or more embodiments, the ISP system also updates a system that is used by front office representatives with the appropriate details, so that customer communications through other means such as phone calls can be handled.

If ISP server 304 determines that the issue counter has not exceeded the threshold value, in block 520 ISP server 304 determines whether the predetermined time period has been exceeded. If ISP server 304 determines that the predetermined time period has not been exceeded, process 500 returns to block 502. If ISP server 304 determines that the predetermined time period has been exceeded, process 500 continues to block 522. In block 522, ISP server 304 resets the issue counter for the area and process 500 returns to 502.

Thus, a computer implemented method, system or apparatus, and computer program product are provided in the illustrative embodiments for alerting a service provider of failed network connectivity by an IoT-enabled modem and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of alerting a service provider of failed network connectivity, comprising:
   determining, by a modem device, a loss of connectivity of the modem device with a network based on a failure of a connectivity test, wherein the connectivity test is repeated after a waiting period that is a first length of time when the connectivity test is successful and is extended to a second length of time when the connectivity test is not successful;
   establishing, by the modem device, wireless communication with a mobile device;
   sending, by the modem device to the service provider, a first notification including details of the loss of connectivity using a first communication,
   wherein the first communication includes using the wireless communication to send, to the mobile device, the first notification with the details of the loss of connectivity, wherein the mobile device, in turn, sends the first notification to the service provider with the details of the loss of connectivity as a first out-of-band communication that includes a message delivered by a wireless service provider to the service provider;
   receiving a second notification of a type of the loss of connectivity, determined by the service provider, and a resolution time for the loss of connectivity, determined by the service provider, using a second communication, the second communication including a second out-of-band communication, the second communication sent by the service provider and received by a first device associated with a user; and
   receiving, by the modem device and a second modem device, an alert sent by the service provider to a set of modem devices associated with the service provider, wherein the modem device and the second modem device are members of the set of modem devices.

2. The method of claim 1, wherein the type of the loss of connectivity includes at least one of a loss of connectivity of the modem device with the service provider or a loss of connectivity of the modem device with the internet.

3. The method of claim 1, further comprising sending a third communication to the service provider, wherein the third communication is a direct communication between the modem device and the service provider, and the third communication being responsive to a second loss of connectivity of the modem device with the internet.

4. The method of claim 1, wherein the first communication is responsive to a loss of connectivity of the modem device with the service provider.

5. The method of claim 1, wherein the message of the first out-of-band communication includes at least one of an electronic mail message or a short message service (SMS).

6. The method of claim 1, wherein the wireless communication uses a wireless communication protocol.

7. The method of claim 6, wherein the wireless communication protocol includes a Bluetooth protocol.

8. The method of claim 1, wherein the resolution time is an approximate resolution time.

9. The method of claim 1, wherein the second out-of-band communication includes at least one of an electronic mail message or a short message service (SMS).

10. The method of claim 1, wherein the service provider is configured to:
    receive the first notification;
    determine the type of the loss of connectivity;
    determine the resolution time for the loss of connectivity; and
    send the second notification to the first device using the second communication.

11. The method of claim 1, wherein the service provider is configured to send a status update indicative of the loss of connectivity to a system associated with a front office of the service provider.

12. The method of claim 1, wherein the service provider is an internet service provider (ISP).

13. A computer usable program product comprising one or more computer-readable storage devices, and program instructions stored on at least one of the one or more storage devices, the stored program instructions comprising:
    program instructions to determine, by a modem device, a loss of connectivity of the modem device with a network based on a failure of a connectivity test, wherein the connectivity test is repeated after a waiting period that is a first length of time when the connectivity test is successful and is extended to a second length of time when the connectivity test is not successful;
    program instructions to establish, by the modem device, wireless communication with a mobile device;
    program instructions to send, by the modem device to a service provider, a first notification including details of the loss of connectivity using a first communication,
    wherein the first communication includes using the wireless communication to send, to the mobile device, the first notification with the details of the loss of connectivity, wherein the mobile device, in turn, sends the first notification to the service provider with the details of the loss of connectivity as a first out-of-band communication that includes a message delivered by a wireless service provider to the service provider;
    program instructions to receive a second notification of a type of the loss of connectivity determined by the service provider, and a resolution time for the loss of connectivity using a second communication, the second communication including a second out-of-band communication, the second communication sent by the service provider and received by a first device associated with a user; and
    program instructions to receive, by the modem device and a second modem device, an alert sent by the service provider to a set of modem devices associated with the service provider, wherein the modem device and the second modem device are members of the set of modem devices.

14. The computer usable program product of claim 13, further comprising sending a third communication to the service provider, wherein the third communication is a direct communication between the modem device and the service provider.

15. The computer usable program product of claim 13, wherein the program instructions are stored in a computer readable storage device in a data processing system, and wherein the program instructions are transferred over a network from a remote data processing system.

16. The computer usable program product of claim 13, wherein the program instructions are stored in a computer readable storage device in a server data processing system, and wherein the program instructions are downloaded over a network to a remote data processing system for use in a computer readable storage device associated with the remote data processing system.

17. A method for notifying of failed network connectivity of a modem device, comprising:
configuring the modem device to repeatedly perform a connectivity test, wherein the modem device repeats the connectivity test after a waiting period that is a first length of time when the connectivity test is successful and is extended to a second length of time when the connectivity test is not successful;
receiving a first notification from the modem device via a modem device using a first communication,
wherein the first communication includes using wireless communication to send the first notification with details of a loss of connectivity to a mobile device, which in turn sends the first notification to a service provider with the details of the loss of connectivity as a first out-of-band communication that includes a message delivered by a wireless service provider to the service provider, and
wherein the first notification is indicative of a loss of connectivity of the modem device with a network;
determining, by the service provider, a type of the loss of connectivity;
determining, by the service provider, a resolution time for the loss of connectivity;
sending a second notification including the type of the loss of connectivity and the resolution time for the loss of connectivity using an out-of-band communication; and
sending, responsive to detecting that a number of notifications received regarding connectivity issues exceeds a threshold value, a third notification as a second out-of-band communication that includes an alert regarding the loss of connectivity sent by the wireless service provider to a set of modem devices associated with the service provider, wherein the modem device and a second modem device are members of the set of modem devices.

18. The method of claim 17, wherein the second notification is sent by the service provider and received by a first device associated with a user.

* * * * *